United States Patent
Aoki et al.

[11] Patent Number: 5,996,759
[45] Date of Patent: Dec. 7, 1999

[54] COIL-ROTATION TYPE ELECTROMAGNETIC CLUTCH

[75] Inventors: Yuuichi Aoki, Chita-gun; Hiroyasu Sakamoto, Kariya; Junichi Ohguchi, Toyoake, all of Japan

[73] Assignee: Denso Corporation, Kariya, Japan

[21] Appl. No.: 09/133,737

[22] Filed: Aug. 13, 1998

[30] Foreign Application Priority Data

Aug. 26, 1997 [JP] Japan ................................. 9-229701

[51] Int. Cl.⁶ ............................ F16D 27/00; F16D 37/02
[52] U.S. Cl. ................................. 192/84.951; 192/84.961
[58] Field of Search .......................... 192/84.951, 84.95, 192/84.96, 84.961

[56] References Cited

U.S. PATENT DOCUMENTS

| | | | |
|---|---|---|---|
| 2,962,141 | 11/1960 | Rudisch | 192/84.951 X |
| 3,314,512 | 4/1967 | Kerestury | 192/84.951 X |
| 4,190,141 | 2/1980 | Bennett et al. | 192/84.951 |
| 5,072,817 | 12/1991 | Shimura | 192/84.961 |
| 5,305,865 | 4/1994 | Larson et al. | 192/84.961 X |
| 5,445,256 | 8/1995 | Tabuchi et al. | 192/84.96 |
| 5,551,546 | 9/1996 | Tabayama et al. | 192/84.96 |

FOREIGN PATENT DOCUMENTS 1-131028 U  9/1989  Japan .

*Primary Examiner*—Charles A. Marmor
*Assistant Examiner*—Roger Pang
*Attorney, Agent, or Firm*—Harness, Dickey & Pierce, PLC

[57] ABSTRACT

In order to improve the magnetic efficiency and the assembling productivity of a coil-rotation type electromagnetic clutch, an electromagnetic coil is located in a ring-shaped recess of a rotor, and friction surfaces facing an armature are formed on both ends of an inner cylindrical portion and an outer cylindrical portion. A friction plate is located in the recess and closer to the armature than the electromagnetic coil. A magnetic shield is located at a place corresponding to the middle of the friction plate in the radial direction. The friction plate is fixed to the ends of the inner cylindrical portion and the outer cylindrical portion by securing protrusions of the friction plate to grooves formed on the inner cylindrical portion and the outer cylindrical portion.

7 Claims, 5 Drawing Sheets

COIL-ROTATION TYPE ELECTROMAGNETIC CLUTCH

CROSS REFERENCE TO RELATED APPLICATIONS

This application is based upon and claims priority from Japanese patent application No. Hei 9-229701 filed Aug. 26, 1997, the entire contents of which are incorporated herein by reference.

BACKGROUND OF THE INVENTION

1. Field of the Invention

The present invention relates to an electromagnetic clutch that cuts and supplies power and that is particularly suitable for driving a compressor in a refrigeration cycle for an automobile air conditioning apparatus.

2. Description of Related Art

One type of known electromagnetic clutch has been generally utilized as a coil-fixed type clutch which has an electromagnetic coil on a fixed member for generating an electromagnetic attractive force. This coil-fixed type electromagnetic clutch forms a passage for supplying current to the electromagnetic coil without an additional current supply member, because the electromagnetic coil is installed in the fixed member.

However, a magnetic circuit, through which flux passes, is formed through the fixed member, the rotational member and an armature magnetically attracted by a drive-side rotational member because the electromagnetic coil is installed in the fixed member. Thus, magnetic gaps are formed among these three circuit components. Therefore, the size of the electromagnetic coil may be increased, or it may consume more electricity, due to greater magnetic loss and lower magnetic efficiency.

To solve this problem, a coil-rotation type which includes the electromagnetic coil on the rotational member is proposed in, for example, JP-U-1-131028. According to the coil-rotation type, the magnetic circuit comprises only the rotational member and the armature magnetically attracted by the rotational member. Therefore, such coil-rotation type has an advantage because the magnetic loss is much smaller and its magnetic efficiency is much higher than the coil-fixed type.

However, according to the electromagnetic clutch disclosed in the above official gazette, a friction plate made out of magnetic substance is joined to the drive-side rotational member made out of magnetic substance, and an armature made out of magnetic substance is facing the friction plate keeping a small gap between the armature and the friction plate. Therefore, magnetic flux of the magnetic circuit, generated by supplying current to the electromagnetic coil, passes through a joint portion between the rotational member and the friction plate.

The rotational member and the friction plate are usually joined by the spot welding or the like, and small gaps exist at the joint portion other than welded points in the circumferential direction. Such the small gaps may cause degradation of the magnetic efficiency.

Furthermore, assembling productivity is low because a positioning of the friction plate against the rotational member in the radial direction can not be made.

SUMMARY OF THE INVENTION

The present invention is made in light of the foregoing problem, and it is an object of the present invention to provide a coil-rotation type electromagnetic clutch which can improve the magnetic efficiency thereof.

It is another object of the present invention to provide a coil-rotation type electromagnetic clutch which can improve the assembling productivity.

According to the electromagnetic clutch of the present invention, a drive-side rotor has an inner cylindrical portion and an outer cylindrical portion to form a ring-shaped recess. A friction plate, which is made out of magnetic substance, is supported by both ends of the inner cylindrical portion and the outer cylindrical portion, and an armature has a magnetic shield at a place opposing to the middle of the friction plate such that at least four electromagnetic attraction portions are formed between the armature and the drive-side rotor and the friction plate.

Since there are at least four electromagnetic attraction portions, an electromagnetic attractive force applied to the armature is increased. Furthermore, there is no other element between the armature and the drive-side rotor and between the armature and the friction plate, and the magnetic flux passes through the armature, the drive-side rotor and the friction plate directly. Therefore, there is no increase of the magnetic resistance caused by a separate component disclosed in the above prior art, and the magnetic efficiency is improved. Therefore, the magnetomotive force of the electromagnetic coil is efficiently utilized for generating the electromagnetic attractive force of the armature.

According to another aspect of the present invention, the friction plate has a first protrusion on its inner circumference to be connected to the first groove formed on the end of the inner cylindrical portion of the drive-side rotor, and a second protrusion on its outer circumference to be connected to the second groove formed on the end of the outer cylindrical portion of the drive-side rotor to support the friction plate at the ends of the inner cylindrical portion and the outer cylindrical portion.

Accordingly, the location of the friction plate in the radial and axial directions is defined by securing the protrusions and the grooves. Therefore, the assembly of the friction plate to the drive-side rotor is facilitated, and the assembling productivity is improved.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
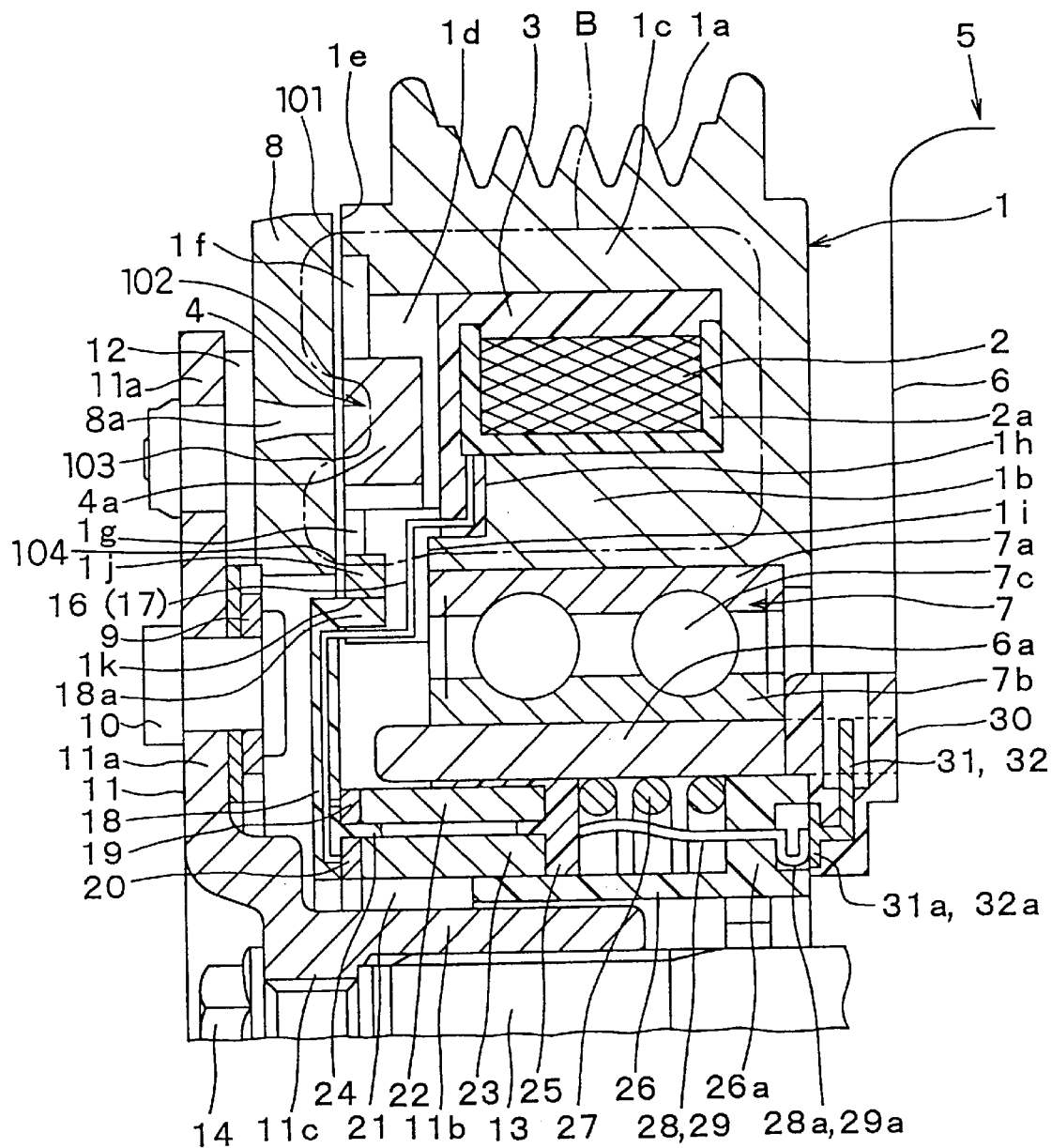
FIG. 1 is a sectional view of a part of an electromagnetic clutch taken along line I—I of FIG. 4 according to a first embodiment of the present invention.

Embodiments of the present invention will be described hereinafter with reference to the drawings.

(First Embodiment)

A first embodiment of the present invention is shown in FIGS. 1 through 7.

A pulley 1a, which has V-shaped grooves that engage V-shaped belts on its periphery, is integrally formed with a rotor 1. The rotor 1 is rotationally mounted to receive rotational power from an automobile engine through a belt which is not shown. The rotor 1 is formed into a double-ring shape having a U-shaped cross section, and is made out of an iron family metal (ferromagnetic material) such as low carbon steel. A ring-shaped recess 1d is formed between an inner cylindrical member 1b and an outer cylindrical member 1c of the rotor 1. The rotor 1 also has a friction surface 1e on the side in its radial direction.

An electromagnetic coil 2 for generating an electromagnetic attractive force is installed in the recess 1d of the rotor 1. The electromagnetic coil 2 wound on a resin spool 2a is fixed to the recess 1d with an insulation by resin 3 formed in the recess 1d. Therefore, the electromagnetic coil 2 rotates together with the drive-side rotor 1.

Figure 7A:
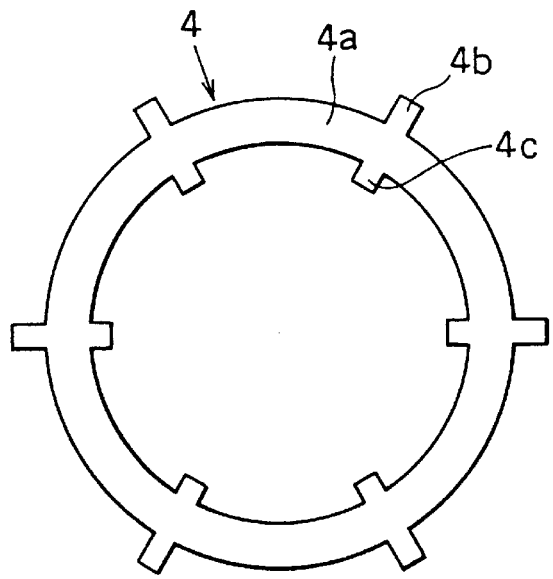
FIG. 7A is a front view of a friction plate to be installed in the rotor of the electromagnetic clutch according to the first embodiment of the present invention.
Figure 7B:
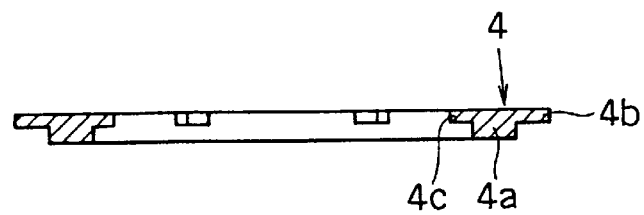
FIG. 7B is a sectional view of the friction plate according to the first embodiment of the present invention.

A friction plate 4 is made out of an iron family metal (ferromagnetic material) such as low carbon steel. As shown in FIG. 7, a plurality of protrusions 4b and 4c are integrally formed on an outer periphery and an inner periphery of a ring-shaped main portion 4a, respectively. These outer protrusions 4b are inserted in and supported by a ring-shaped groove 1f (see FIGS. 1, 2 and 4) of the outer cylindrical member 1c of the rotor 1. The inner protrusions 4c are inserted in and supported by a ring-shaped groove 1g (see FIGS. 1, 2 and 4) of the inner cylindrical member 1b of the rotor 1. Further, the inner protrusions 4c are fixed to the inner cylindrical member 1b of the rotor 1 by means of, for example, welding.

Figure 4:
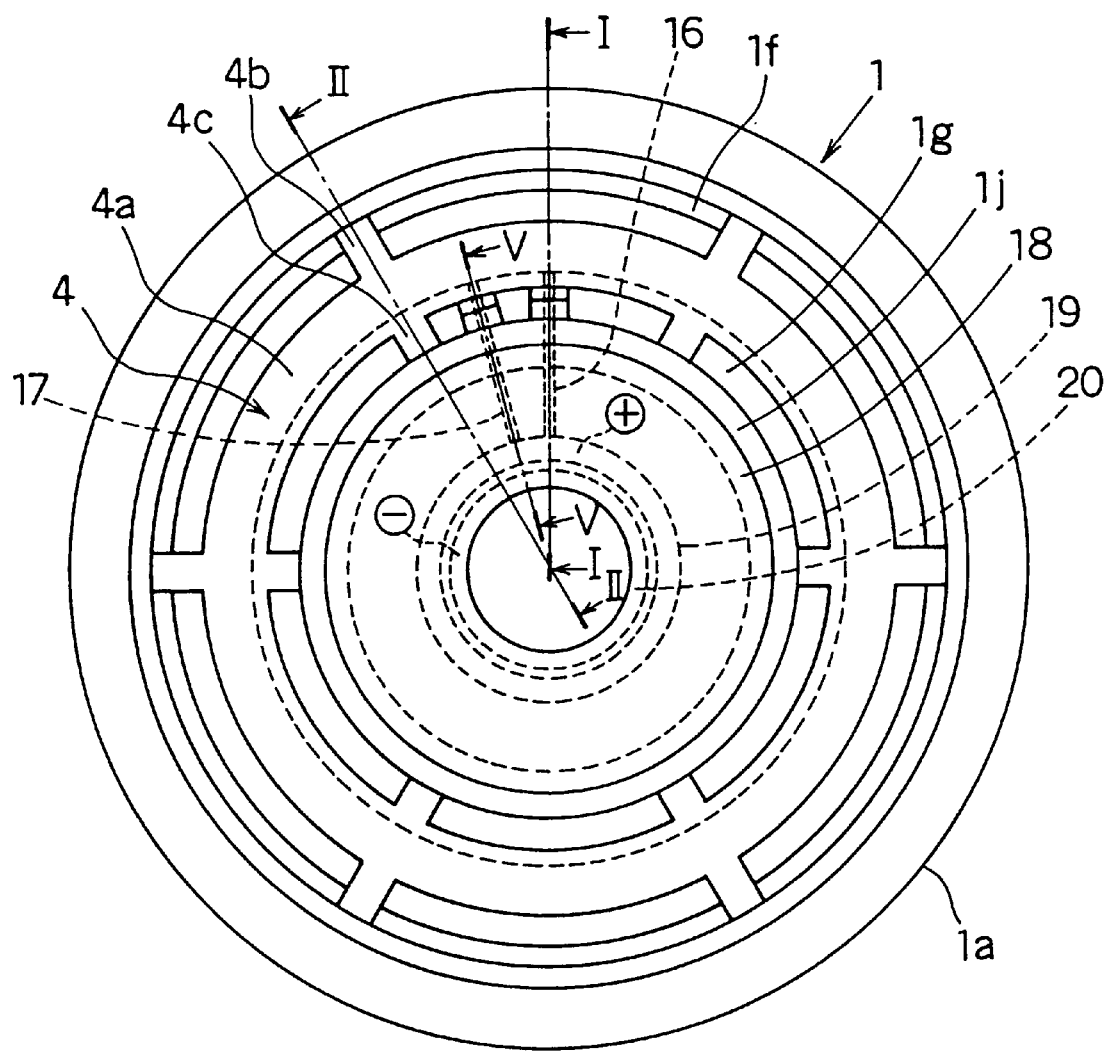
FIG. 4 is a front view of a rotor of the electromagnetic clutch according to the first embodiment of the present invention.

FIG. 4 shows an assembly aspect of the friction plate 4 to the rotor 1. The friction plate 4 is assembled to the rotor 1 after fixing the electromagnetic coil 2 in the recess 1d of the rotor 1 by resin 3 with an insulation.

Figure 2:
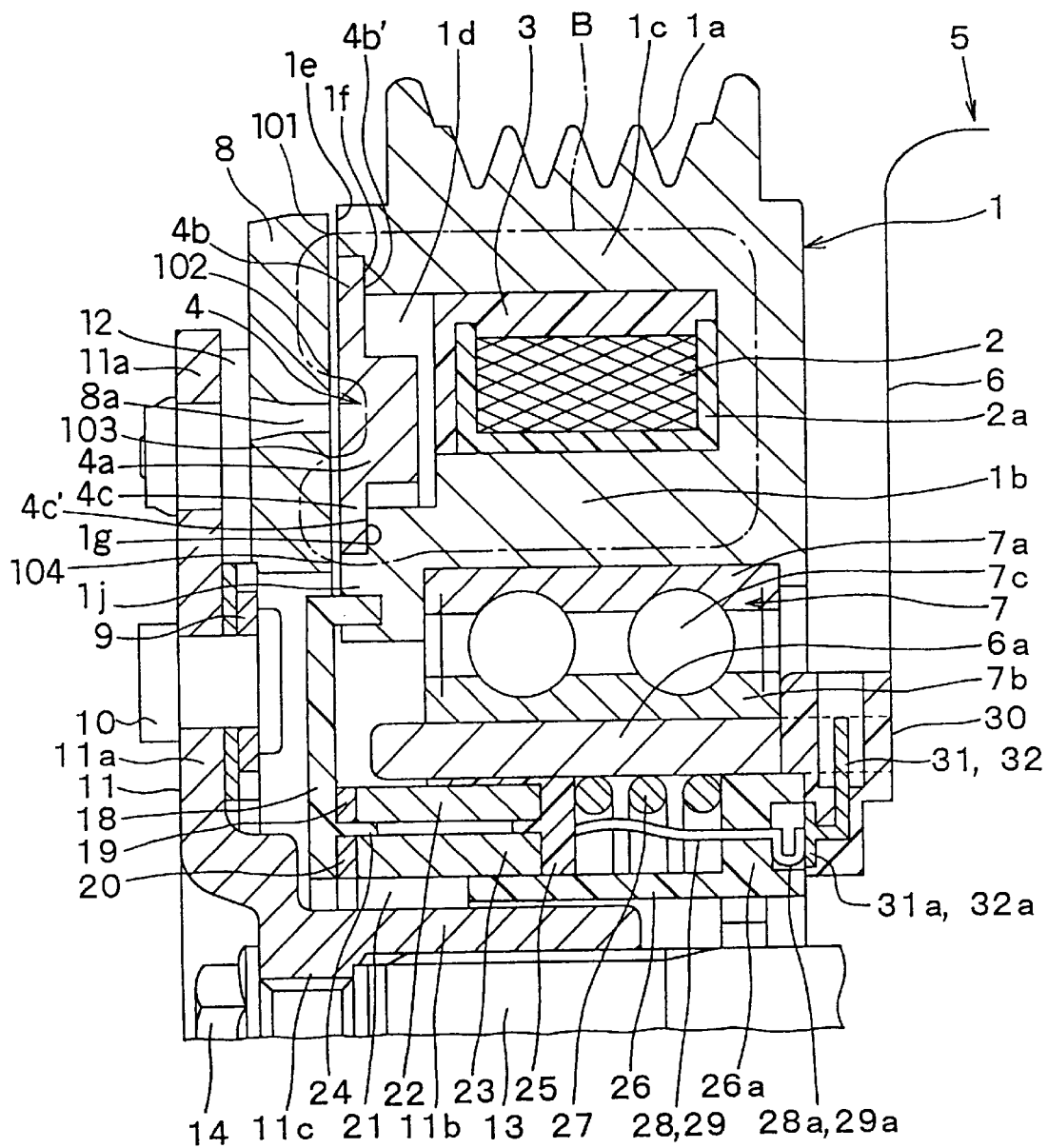
FIG. 2 is a sectional view of a part of the electromagnetic clutch taken along line II—II of FIG. 4 according to the first embodiment of the present invention.
Figure 3:
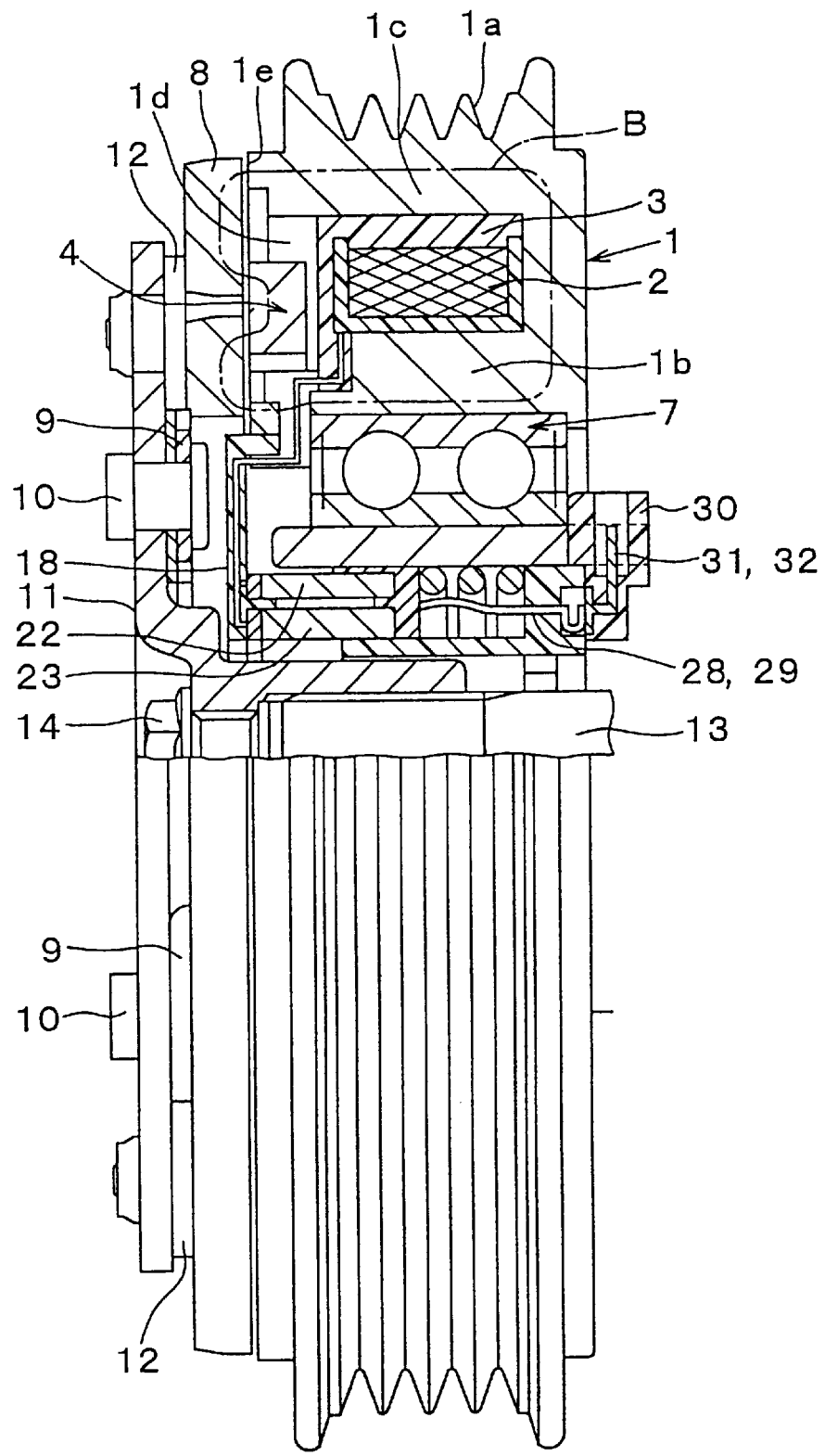
FIG. 3 is a partial sectional view of an entirety of the electromagnetic clutch according to the first embodiment of the present invention.

As shown in FIGS. 4 and 7, each six of the outer and inner protrusions 4b and 4c of the friction plate 4 are formed with the same space among them. As shown in FIG. 2 side surfaces 4b' and 4c' of the protrusions 4b and 4c are contacting side walls of the ring-shaped grooves 1f and 1g, respectively, to define the position of the friction plate 4 in the axial direction. As shown in FIGS. 2 and 4, an outer circumferential end of the protrusions 4b are contacting an outer peripheral wall of the ring-shaped groove 1f, and an inner circumferential end of the protrusions 4c are contacting an inner peripheral wall of the ring-shaped groove 1g, to define the position of the friction plate 4 in the radial direction. Circumferential position of the friction plate 4 is not defined because it is not necessary.

A compressor 5, which is a slave device (rotational equipment), has a front housing 6 which is located on the electromagnetic clutch side. The front housing 6 is made out of an aluminum family metal and is integrally formed with a cylindrical boss 6a, which protrudes outwardly in the axial direction at its center portion. The compressor 5 compresses refrigerant used in the refrigeration cycle of an air conditioning apparatus for an automobile, and could be a known swash plate type, vane type, or scroll type compressor.

A bearing 7 rotatably supports the rotor 1 on the boss 6a of the front housing 6. The bearing 7 comprises an outer ring 7a fixed to an inner surface of the rotor 1, an inner ring 7b fixed to an outer surface of the boss 6a, and balls 7c supported between the outer ring 7a and the inner ring 7b such that the balls 7c move by rolling.

An armature 8, which is made out of an iron family metal (ferromagnetic material) and has a shape of a ring plate, is installed facing the friction surface 1e of the rotor 1 and the friction plate 4. The armature 8 is retained by the spring action of a leaf spring 9 (elastic connecting member) at a location (shown in FIGS. 1 through 3) that maintains a small gap between the armature 8 and the friction surface 1e of the rotor 1 when the current is not supplied to the electromagnetic coil 2. The leaf spring 9 is a long narrow thin plate. Several leaf springs 9 are placed in the circumferential direction of the armature 8. One end of each leaf spring 9 is connected to the armature 8 by a rivet which is not shown, and the other end of each leaf spring 9 is connected to a hub 11 by a rivet 10.

Several circular arc-shaped grooves 8a, as a magnetic shield member, which extend along the circumferential direction are formed at a place corresponding to the middle of a main portion 4a of the friction plate 4 in the radial direction of the armature 8. A magnetic circuit B of the electromagnetic coil 2 is bent at the middle of the radial direction of the armature 8 between the friction plate 4 and the main portion 4a by forming the grooves 8a as shown in FIGS. 1 and 2.

As shown in FIG. 4, the size of each protrusion 4b, 4c in the circumferential direction is quite small, and magnetic resistance at the protrusions 4b, 4c is quite large. Therefore, very few magnetic flux passes through the protrusions 4b, 4c, and most magnetic flux passes through the portion between the inner circumferential portion of the armature 8 and the end portion of the inner cylindrical member 1b of the rotor 1, and the portion between the outer circumferential portion of the armature 8 and the end portion of the outer cylindrical member 1c of the rotor 1 as shown by the magnetic circuit B.

Accordingly, four poles (four places) of electromagnetic attraction portions 101, 102, 103, 104 are formed in the radial direction between the armature 8 and the rotor 1 and the friction plate 4.

The hub 11 is made out of an iron family metal, and has a disk portion 11a which is extended in the radial direction and a central cylinder portion 11b. A stopper 12, which is made out of an elastic material such as rubber, is attached to an outer periphery of the disk portion 11a. The stopper 12 defines the location of the armature 8 in the axial direction (the location of the armature 8 when the current is not supplied to the electromagnetic coil).

The central cylinder portion 11b of the hub 11 engages a drive shaft 13 of the compressor 5 by means of a spline connection to prevent a relative rotation. The hub 11 is connected to the drive shaft 13 by screwing a bolt 14 into a threaded hole at the edge of the drive shaft 13 and holding an inner collar 11c of the hub 11 between a step portion of the drive shaft 13 and the bolt 14.

A passage structure for supplying current to the electromagnetic coil 2, which rotates together with the rotor 1, will be described hereinafter. A sliding current supply mechanism having slip rings 19, 20 and brushes 22, 23 is located at an inner periphery of the compressor boss 6a which supports the bearing 7 in the current supply passage.

The location of the sliding current supply mechanism is arranged as follows. Grooves 1h, 1i are formed on the inner cylindrical member 1b of the rotor 1 at the armature 8 side and inside the electromagnetic coil 2. Two leads 16, 17, separated from each other by a certain distance for insulating purposes, are connected to an anode and a cathode of the electromagnetic coil 2, and are inwardly wired in the grooves 1h, 1i. One of the leads 16, 17 is omitted in FIGS. 1 and 2 to simplify the drawings. In this embodiment of the present invention, the leads 16, 17 are bare leads made out of a conductor, such as copper or aluminum.

A ring-shaped retaining plate 18, which is made out of an electrical insulating material such as resin, is located inside the inner periphery of the armature 8 and the friction plate 4. The retaining plate 18 has a plurality of projections 18a on its outer circumferential periphery. The inner cylindrical member 1b has an inner projection 1j and a recess 1k which is formed on the inner projection 1j. The retaining plate 18 is integrally supported in the inner periphery of the rotor 1 such that the retaining plate 18 rotates together with the rotor 1 by joining and latching the projections 18a to the recess 1k.

Figure 5:
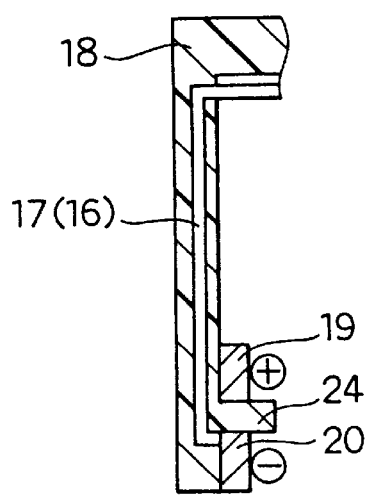
FIG. 5 is a sectional view of a part of the electromagnetic clutch taken along line V—V of FIG. 4 according to the first embodiment of the present invention.

The anode side slip ring 19 and the cathode side slip ring 20 are concentrically fixed to the boss 6a side at the inner circumferential portion of the retaining plate 18. As shown in FIG. 5, the inner circumferential portion of each of the leads 16, 17 is buried inside the retaining plate 18, and the inner circumferential edge of each of the leads 16, 17 is electrically connected to the anode side and the cathode side slip rings 19, 20, respectively.

A pipe-shaped gap 21 is formed between the central cylinder portion 11b of the hub 11 fixed to the drive shaft 13 of the compressor 5 and the inner periphery of the boss 6a. The anode side brush 22 and the cathode side brush 23 are installed in the gap 21. The brushes 22, 23 are pipe-shaped. Ring-shaped retaining members 24 and 25, which are made out of an electrical insulating material such as resin, are located at both ends of the brushes 22 and 23 in the axial direction.

The retaining members 24, 25 retain the pipe-shaped brushes 22, 23 to maintain a certain gap in the radial direction between the brush 22 and the brush 23 for the purpose of achieving the electrical insulation. Further, another electrical insulation between the outer brush 22 and the inner circumferential surface of the boss 6a is achieved by an extended portion at the outer circumference of the retaining member 25. Although the retaining member 24 can be integrally formed with the retaining plate 18, a separate member may be attached to the retaining plate 18 to achieve the same function.

Figure 6:
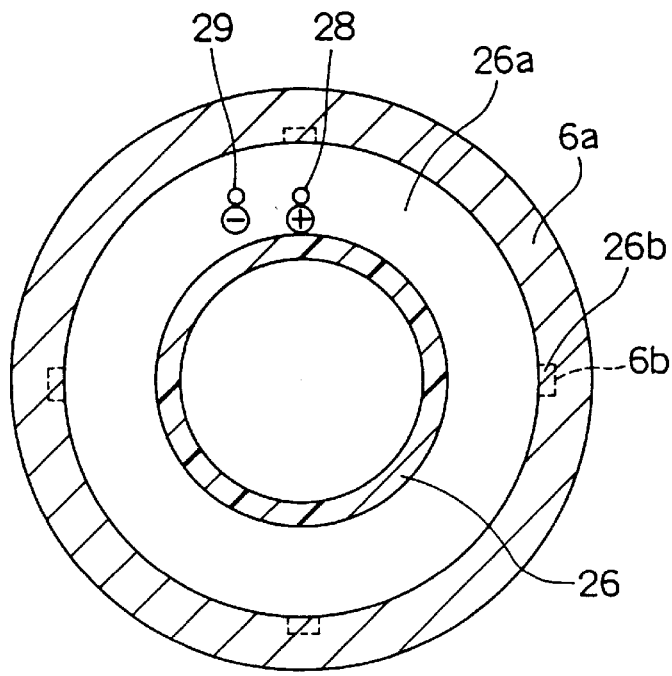
FIG. 6 is a sectional view of a part of the electromagnetic clutch showing the positions of a boss and a cylindrical holding member according to the first embodiment of the present invention.

Furthermore, a pipe-shaped retaining member 26, which extends from the inner circumferential portion of the inner brush 23 to the compressor 5, is installed in the gap 21. The retaining member 26 is also made out of an electrical insulating material such as resin, and has a plurality of projections 26b at the outer circumferential portion of a collar 26a of the retaining member 26 as shown in FIG. 6. The retaining member 26 is supported by the inner circumferential portion of the boss 6a by joining and latching the projections 26b to a recess 6b which is formed on the inner circumferential surface of the boss 6a.

The retaining member 26 is fixed to the boss 6a holding a certain gap between the inner circumferential surface of the retaining member 26 and the outer circumferential surface of the central cylinder portion 11b of the hub 11. The retaining member 25 is supported between the outer circumferential surface of the retaining member 26 and the inner circumferential surface of the boss 6a.

A coil spring 27, as an elastic bias member for elastically biasing the brushes 22 and 23, is located between the retaining member 25 and the collar 26a of the retaining member 26 to bias the brushes 22, 23 into contact with the slip rings 19, 20. One end of each of the anode side lead 28 and a cathode side lead 29 is electrically connected to the brushes 22, 23, respectively, extending through the retaining member 25. One of the leads 28, 29 is omitted in the drawings to simplify the drawings.

Each of the leads 28, 29 is covered by an insulation film. The other ends of the leads 28, 29 are exposed to the outside of the collar 26a extending through the collar 26a of the retaining member 26. Hook portions 28a, 29a, having a predetermined spring constant, are formed at the exposed ends of the leads 28, 29.

A resin connector 30 is formed and fixed on the outer surface of the front housing 6. Terminals 31, 32, which each have a thin plate shape and are made out of a conductor, are outwardly provided in the radial direction of the front housing 6 to maintain a gap between the terminal 31 and the terminal 32 in the connector 30. One of the terminals 31, 32 is omitted in the drawings to simplify the drawings.

The terminals 31, 32 have plate portions 31a, 32a, respectively, which oppose the collar 26a of the retaining member 26. The leads 28, 29 are electrically connected to the terminals 31, 32 since the hooks 28a, 29a of the leads 28, 29 are elastically biased and contact the plate portions 31a, 32a.

A current supply passage of the electromagnetic coil 2 comprises the leads 16, 17, the slip rings 19, 20, the brushes 22, 23, the leads 28, 29, and the terminals 31, 32. The terminals 31, 32 are electrically connected to an external control circuit (not shown) for controlling a connection and a disconnection of the electromagnetic clutch (that is ON and OFF operation of the compressor 5).

The operation of the first embodiment will be described hereinafter. When the automobile engine (not shown) is driven, the rotational power of a crank pulley of the engine is transmitted to the pulley 1a via the belt (not shown) and the rotor 1. The rotor 1 and the electromagnetic coil 2 always rotate, as the rotor 1 is rotationally supported on the outer circumferential surface of the boss 6a of the front housing 6 by the bearing 7.

The leads 16, 17, the retaining plate 18, retaining member 24 and the slip rings 19, 20 rotate together with the rotor 1 and the electromagnetic coil 2 according to the rotation of the rotor 1 and the electromagnetic coil 2. On the contrary, all the brushes 22, 23, the retaining members 25, 26, the coil spring 27, and the leads 28, 29 are supported by the boss 6a and fixed. Therefore, the rotating slip rings 19, 20 slide on one end of each of the brushes 22, 23 in the axial direction keeping contacts with the brushes 22, 23 which are biased by the spring force of the coil spring 27.

Under such circumstances, when a voltage is applied from a car battery to the terminals 31, 32 of the connector 30 by the external control circuit to operate the compressor 5, current is supplied to the electromagnetic coil 2 via the current supply passage formed by the above described elements (16, 17, 19, 20, 22, 23, 28, 29). Thus, a magnetic circuit B (see FIGS. 1 and 2) is formed between the rotor 1 and the armature 8 by magnetic flux. Therefore, an electromagnetic attractive force is generated between the friction surface 1e and the armature 8, and between the friction plate 4 and the armature 8. The friction surface 1e of the rotor 1 and the friction plate 4 attract the armature 8 against the spring force along the axial direction (the spring force to the left in FIGS. 1 and 2) of the leaf spring 9.

As a result, the armature 8 rotates together with the rotor 1, and rotates together with the hub 11 via the leaf spring 9 and the rivet 10. Thus, the rotational power of the rotor 1 is transmitted to the drive shaft 13 of the compressor 5 via the hub 11, and the compressor 5 is driven.

In the magnetic circuit B in FIGS. 1 and 2, four poles (four places) of electromagnetic attraction portions 101, 102, 103, 104 are formed in the radial direction between the armature 8 and the rotor 1 and the friction plate 4, and the electromagnetic attractive force of the armature 8 increases according to an increase in the number of the poles of the electromagnetic attraction portions 101, 102, 103, 104. Therefore, the electromagnetic attractive force is increased by forming the electromagnetic attraction portions 101, 102, 103, 104.

Furthermore, there is no separate component between the armature 8 and the rotor 1, and between the armature 8 and the friction plate 4. Thus, the magnetic flux passes through the components directly, and there is no increase of the magnetic resistance caused by a separate component disclosed in the prior art, and the magnetic efficiency is improved. Therefore, the magnetomotive force of the electromagnetic coil 2 is efficiently utilized for generating the electromagnetic attractive force of the armature 8, and the size of the electromagnetic coil 2 is reduced and the electric power consumption is reduced because the diameter of the wire of the electromagnetic coil 2 is reduced.

According to the first embodiment of the present invention, the friction plate 4 has the protrusions 4b, 4c, and the grooves 1f, 1g are formed to match the protrusions 4b, 4c with the grooves 1f, 1g to support the friction plate 4.

Accordingly, the location of the friction plate 4 in the radial and axial directions is defined by joining the protrusions 4b, 4c and the grooves 1f, 1g. Therefore, the assembly go of the friction plate 4 to the rotor 1 is facilitated, and the assembling productivity is improved.

In the first embodiment, the grooves 1f, 1g are formed in a ring shape. Therefore, it is easy to form the grooves 1f, 1g.

Furthermore, the inner protrusion 4c is fixed to the end portion of the inner cylindrical member 1b by welding or the like. Therefore, the friction plate 4 is fixed to the rotor 1 rigidly.

The supplying current to the electromagnetic coil 2 is stopped when the compressor 5 is to be cut off. When the supplying current to the electromagnetic coil 2 is stopped, the above described electromagnetic attractive force disappears. Therefore, the armature 8 is detached from the friction surface 1e of the rotor 1 and the friction plate 4, and the transmission of the rotational power to the drive shaft 13 of the compressor 5 is cut off, and the compressor 5 stops.

(Other Modifications)

In the first embodiment of the present invention, the drawings show the pulley 1a which is integrally formed with the rotor 1. However, a separately formed pulley 1a may be used by joining it to the rotor 1.

In the first embodiment, the inner protrusion 4c is fixed to the end portion of the inner cylindrical member 1b by welding or the like. However, the outer protrusion 4b may be fixed to the end portion of the outer cylindrical member 1c by welding or the like instead. Furthermore, both of the inner protrusion 4c and the outer protrusion 4b may be fixed to both of the ends of the inner cylindrical member 1b and the outer cylindrical member 1c.

The grooves 1f and 1g are not limited to the ring shape, and they may be formed at only a portion corresponding to the protrusions 4b, 4c to define the location of the friction plate 4 in the circumferential direction.

In the first embodiment, the circular arc-shaped grooves 8a, as the magnetic shield member, are formed at the middle of the armature 8 in the radial direction. However, the armature 8 may be divided into an outer ring member and an inner ring member at the place corresponding to the circular arc-shaped grooves 8a, and joined together by non-magnetic metal (for example, copper or the like) instead.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An electromagnetic clutch for selectively transmitting rotational force from a rotational power generating source to a drive shaft of an equipment to be driven, said electromagnetic clutch comprising:

a drive-side rotating member which is rotated by the rotational force, and which is made out of a magnetic substance;

an electromagnetic coil mounted on the drive-side rotating member while being electrically insulated from the drive-side rotating member, said electromagnetic coil generating electromagnetic attractive force when a current is supplied thereto;

a slave-side rotating member connected to the drive shaft;

an armature which is coupled with the drive-side rotating member in response to the electromagnetic attractive force generated by the electromagnetic coil, and which is made out of a magnetic substance; and an elastic connecting member for connecting the slave-side rotating member and the armature, said connecting member is capable of being deformed elastically, wherein;

said drive-side rotating member has an inner cylindrical portion and an outer cylindrical portion for forming a ring-shaped recess having a U-shaped cross section along an axial direction of the shaft;

said electromagnetic coil is located in the recess;

said inner cylindrical portion has a first friction surface opposing to the armature on an end of the inner cylindrical portion;

said outer cylindrical portion has a second friction surface opposing to the armature on an end of the outer cylindrical portion;

said drive-side rotating member has a friction plate made out of a magnetic substance between the electromagnetic coil and the armature;

said armature has a magnetic shield member at a place opposing to the middle of the friction plate in its radial direction;

said friction plate has a first protrusion on its inner circumference and a second protrusion on its outer circumference to support the friction plate at the ends of the inner cylindrical portion and the outer cylindrical portion;

at least four electromagnetic attraction portions are formed in the radial direction between the armature and the drive-side rotating member and the friction plate;

said end of the inner cylindrical portion of the drive-side rotating member has a first groove for supporting the first protrusion; and said end of the outer cylindrical portion of the drive-side rotating member has a second groove for supporting the second protrusion.

2. An electromagnetic clutch according to claim 1, wherein:

said first and second grooves have a ring shape.

3. An electromagnetic clutch according to claim 1, wherein:

at least one of the first and second protrusions is fixed to one of the ends of the inner cylindrical portion and the outer cylindrical portion by welding.

4. An electromagnetic clutch for selectively transmitting rotational force from a rotational power generating source to a drive shaft of an equipment to be driven, said electromagnetic clutch comprising:

a rotating member which is rotated by the rotational force, and which is made out of a magnetic substance;

an electromagnetic coil mounted on the rotating member while being electrically insulated from the rotating member, said electromagnetic coil generating electromagnetic attractive force by forming a magnetic path of magnetic flux when a current is supplied thereto;

an armature which is coupled with the rotating member in response to the electromagnetic attractive force generated by the electromagnetic coil;

a first protrusion formed on the friction plate to be supported by the end of the inner cylindrical portion of the rotating member; and a second protrusion formed on the friction plate to be supported by the end of the outer cylindrical portion of the rotating member, wherein said rotating member has an inner cylindrical portion and an outer cylindrical portion for forming a ring-shaped recess having a U-shaped cross section along an axial direction of the shaft;

said electromagnetic coil is located in the recess;

said inner cylindrical portion has a first friction surface opposing to the armature on an end of the inner cylindrical portion to be coupled with the armature in response to the electromagnetic attractive force;

said outer cylindrical portion has a second friction surface opposing to the armature on an end of the outer cylindrical portion to be coupled with the armature in response to the electromagnetic attractive force;

said rotating member has a friction plate made out of a magnetic substance to be coupled with the armature in response to the electromagnetic attractive force, wherein said friction plate is located between the electromagnetic coil and the armature and supported at the ends of the inner cylindrical portion and the outer cylindrical portion;

said armature has a magnetic shield member for shielding its portion opposing to the middle of the friction plate in its radial direction from the magnetic flux such that the magnetic path is formed through the first friction surface, an inner portion of the armature in its radial direction, the friction plate, an outer portion of the armature in its radial direction and the second friction surface;

said end of the inner cylindrical portion of the rotating member has a first groove on an inner periphery of the recess for supporting the first protrusion; and said end of the outer cylindrical portion of the rotating member has a second groove on the inner periphery of the recess for supporting the second protrusion.

5. An electromagnetic clutch according to claim 4, wherein:

said magnetic shield member has a plurality of circular arc-shaped grooves formed between the inner portion and the outer portion of the armature along its circumferential direction.

6. An electromagnetic clutch according to claim 4, wherein:

each of said first and second grooves has a ring shape.

7. An electromagnetic clutch according to claim 4, wherein:

said magnetic shield member has a gap between the inner portion of the armature and the outer portion of the armature in its radial direction at the portion opposing to the middle of the friction plate in its radial direction between the first protrusion and the second protrusion.

* * * * *